UNITED STATES PATENT OFFICE.

EMMA C. SICKELS, OF WASHINGTON, DISTRICT OF COLUMBIA.

REFINING VEGETABLE OILS.

SPECIFICATION forming part of Letters Patent No. 636,860, dated November 14, 1899.

Application filed July 14, 1898. Serial No. 685,944. (No specimens.)

*To all whom it may concern:*

Be it known that I, EMMA C. SICKELS, a citizen of the United States, residing at Washington, in the District of Columbia, have invented certain new and useful Improvements in the Rectification of Vegetable Oils, of which the following is a specification.

My present invention pertains to an improved method of treating or rectifying vegetable oils; and it consists in the various steps and details hereinafter set forth.

The process is especially designed for the treatment of corn-oil to relieve or free it of the rancid flavor which is so common in the article of commerce and which renders it unfit for various uses. While especially efficacious for the rectification of corn-oil, the process is also applicable to the treatment of other vegetable oils—such, for instance, as cottonseed oil, peanut-oil, and oil extracted from the watermelon-seed—and I do not, therefore, desire to be understood as confining myself solely to the treatment of corn-oil in the following process.

I have found that by boiling the oil with alkali soil the oil is rectified to a certain extent and the rancid flavor somewhat removed. To produce, however, a complete rectification, I prefer to use the soil in conjunction with other ingredients, as follows: To one pound of oil there are added two ounces of the alkali soil of the Bad Lands, one ounce of coffee-charcoal, one ounce of animal charcoal, and one ounce of water. The alkali soil here spoken of is the well-known soil of the "Bad Lands" of the States of South Dakota, Nebraska, Wyoming, and Montana, the greater portion, however, being situated in the first-mentioned State. By this statement I do not desire to confine myself to soil obtained from this exact locality, as it is manifest that so long as the soil acts in the manner set forth it matters not from whence it is obtained. The "coffee-charcoal" is made by charring coffee either from the fresh beans, whole or ground, or from the waste grounds. The oil and the other ingredients mixed therewith are then boiled for about two hours at a temperature of approximately 250° Fahrenheit. After having been boiled the necessary period the mass is placed upon a filter comprising, preferably, a layer of coffee-charcoal, an intermediate layer of animal charcoal, and a bottom layer of alkali soil, the resultant oil which passes through the same being clear and free from all rancid taste.

The proportions above set forth have been found to give excellent results, though they must be varied according as the acidity of the oil varies. Sometimes I have also found it advisable to add gypsum in order to eliminate the rancid taste which renders the oil unfit for use. Whether or not the addition of gypsum is advisable may be readily determined by the action of the oil when the other ingredients are mixed therewith, especially the alkali soil, for there is a certain effervescence which takes place which continues for a period if the alkali soil is sufficient to give the desired result. Should this effervescence not continue long enough, then it will be evident that the acid is not sufficiently acted upon, and the addition of gypsum becomes advisable.

With some grades and conditions of oil and with the varying conditions of the coffee-charcoal and the animal charcoal of commerce it has been found advantageous to introduce, say, one-half ounce of bone-ash to one pound of oil to bring about a complete rectification, the bone-ash seeming to purify the other ingredients of any matter which they may have absorbed, and thus bring them to their proper active condition.

An analysis of one sample of soil secured from the Elkhorn river region shows the presence of the following ingredients or constituent elements: silicious, 63.07 per cent.; ferric oxid, 2.85 per cent.; alumina, 8.41 per cent.; lime, (carbonate,) 7.08 per cent.; lime, (phosphate,) .90 per cent.; magnesia, (carbonate,) 1.41 per cent.; potash, .50 per cent.; soda, .49 per cent.; sulfuric acid, .79 per cent.; organic matter, fourteen per cent.; loss in analysis, .50 per cent.

So far as I have been able to determine by analysis and by tests it would seem that the action of the alkali soil is due to the presence of carbonate of lime, potash, and a slight trace of phosphoric acid, though I do not desire to restrict myself in any manner by this statement, it being made for the sole purpose of explanation. Suffice it to say that the use of this well-known soil in the manner above stated brings about the desired result.

Having thus described my invention, what I claim is—

1. The herein-described process of rectifying vegetable oils, which consists in boiling the oil in the presence of the specified natural soil, substantially as described, said soil being characterized by having a slight alkaline reaction and as containing a relatively large percentage of silica and alumina.

2. The herein-described process of rectifying vegetable oils which consists in boiling the same in the presence of animal charcoal, coffee-charcoal, water, and alkali soil, in substantially the proportions stated.

3. The herein-described process of rectifying vegetable oils which consists in boiling the same in the presence of animal charcoal, coffee-charcoal, water, and alkali soil, in substantially the proportions stated, and finally filtering the same.

4. The herein-described process of rectifying vegetable oils which consists in boiling the same in the presence of animal charcoal, coffee-charcoal, water, and alkali soil; and finally passing the same through a filter composed of layers of coffee-charcoal, animal charcoal and alkali soil.

5. The herein-described process of rectifying vegetable oils which consists in boiling the same in the presence of animal charcoal, coffee-charcoal, water, alkali soil and gypsum; and finally passing the same through a filter composed of layers of coffee-charcoal, animal charcoal, and alkali soil, substantially as described.

6. The herein-described process of rectifying corn-oil, which consists in boiling the oil at a temperature of approximately 250° in the presence of animal charcoal, coffee-charcoal, and alkali soil, in substantially the proportions stated; and finally passing the same through a filter composed of layers of coffee-charcoal, animal charcoal, and alkali soil, substantially as described.

7. The herein-described process of rectifying vegetable oils which consists in boiling said oil at a temperature of approximately 250° in the presence of animal charcoal, coffee-charcoal, alkali soil, and bone-ash, in substantially the proportions stated, and finally filtering the same.

8. The herein-described process of rectifying vegetable oils which consists in boiling said oil in the presence of the specified alkali soil and coffee-charcoal, substantially as described.

In witness whereof I hereunto set my hand in the presence of two witnesses.

EMMA C. SICKELS.

Witnesses:
HORACE A. DODGE,
JULIA M. POND.